May 27, 1952 N. E. LINDENBLAD 2,598,064

AIR-BORNE RADIO RELAYING SYSTEM

Filed Jan. 7, 1942 2 SHEETS—SHEET 1

INVENTOR
NILS E. LINDENBLAD
BY H. S. Grover
ATTORNEY

May 27, 1952 N. E. LINDENBLAD 2,598,064

AIR-BORNE RADIO RELAYING SYSTEM

Filed Jan. 7, 1942 2 SHEETS—SHEET 2

INVENTOR
NILS E. LINDENBLAD
BY H. S. Grover
ATTORNEY

Patented May 27, 1952

2,598,064

UNITED STATES PATENT OFFICE 2,598,064

AIR-BORNE RADIO RELAYING SYSTEM

Nils E. Lindenblad, Port Jefferson, N. Y., assignor to Radio Corporation of America, a corporation of Delaware Application January 7, 1942, Serial No. 425,824

9 Claims. (Cl. 250—15)

Figure 1:
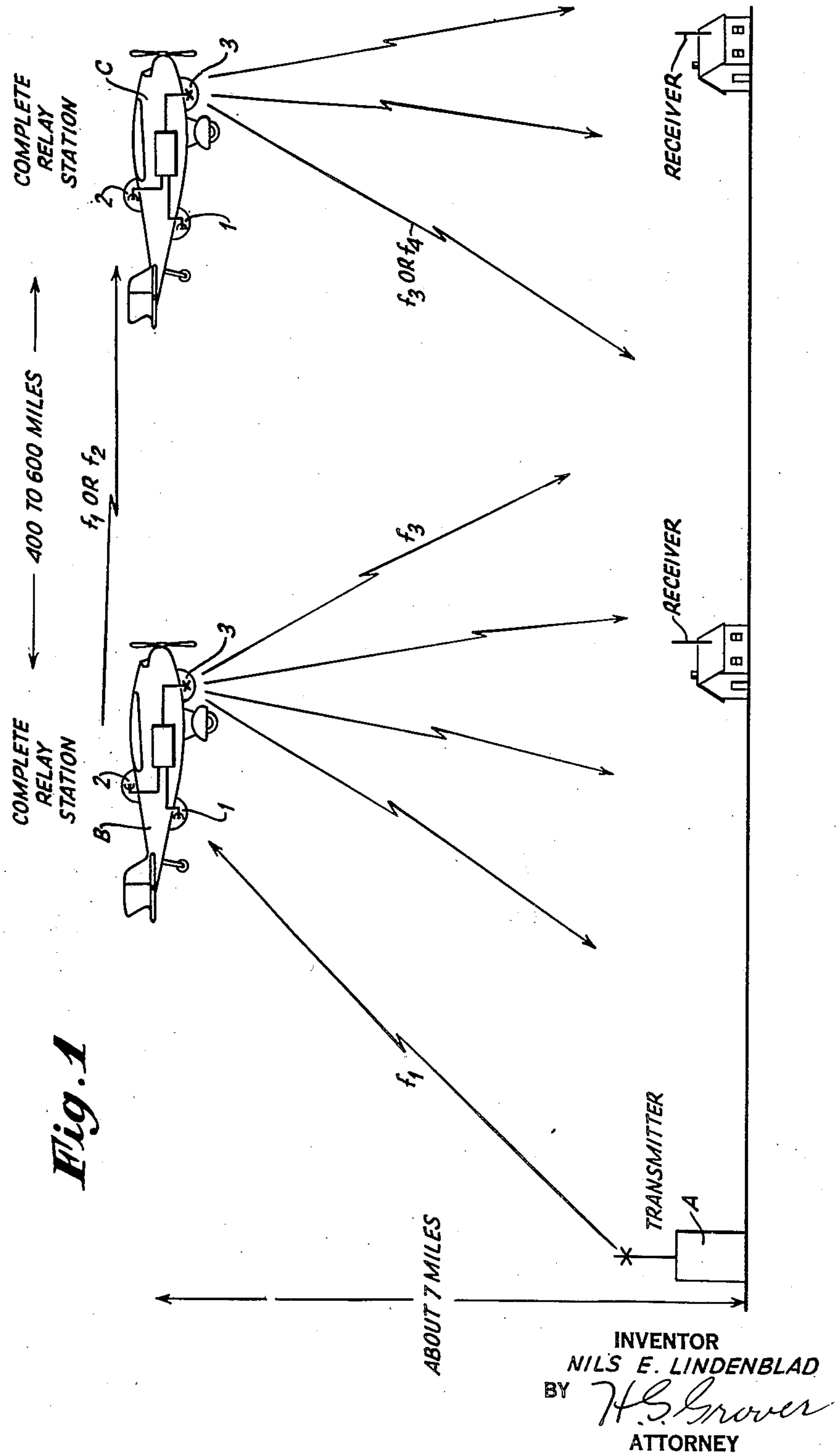

This invention relates to the transmission of radio signals, and more particularly to arrangements for relaying such signals between remote points.

It is well known that electromagnetic waves at the lower wavelengths below ten meters have characteristics which are quasi-optical in nature; that is, they have a very definite limited range of transmission which is comparable with the optical range or visible distance. It has been found that ultra short wave signals transmitted between a pair of ground stations are not received beyond points separated from the transmitting station by distances as short as forty miles. The interposition of any object in the path of transmission also affects, to an extent at least, the ability of a station to receive the transmitted signal. It will thus be evident that the ability of a station to receive the transmitted or radiated energy may be affected by the condition of the local topography which is an element of consideration in the design of an ultra short wave communication system. In view of the limited range of transmission of the ultra short waves, it will be appreciated that in an area such as the United States it may require at least 1000 stationary relays to give adequate television service to all rural areas. Such a number of stations would require a tremendous investment and would render the programs which can be put out over a station very costly.

One of the objects of the present invention is to provide a radio relaying system wherein the distance range of transmission between adjacent repeater stations of the relaying system or from one repeater station to the receivers served by said station is considerably increased.

A further object of the invention is to provide a radio relaying system wherein the local topography has little or no influence between the repeater station and the receivers being served by this repeater station.

A further object is to provide a radio relaying system having a minimum number of stations serving a considerable area, and wherein the service radius of a relay station is at least one hundred miles or greater.

Briefly stated, the present invention contemplates an ultra high frequency radio relaying system employing relay stations carried in airplanes flying at considerable heights. It is preferred that the airplanes be located in the stratosphere, about 35,000 feet or higher above ground, in which case each plane would be equipped with a supercharger to maintain the same atmospheric pressure within the plane that exists at ground level. At such an altitude, the airplanes would be flying above the weather and the service radius would be 230 miles. In other words, each airplane would be a completely equipped receiving and transmitting station capable of serving a circular area whose diameter is about 500 miles. By positioning adjacent airplane relay stations 400 to 600 miles apart from one another, it would thus be possible to give adequate television service to the United States with only about twenty stratosphere relays to perform the same service and perhaps better service than presently contemplated systems which would require about 1000 ground relay stations. In employing my invention, it is proposed to employ a plane which possesses great lifting power and slow speeds, in order to economize in the consumption of fuel for maintaining the relay station in the air. The speed of the airplane need only be sufficient to overcome the wind velocities prevalent in the stratosphere. In order to overcome difficulties in landing the airplane through bad weather at some commercial airport, or in flying a relay station from the airport into the air in order to take over the duty of another plane, such planes may easily land at airports where the weather is good for flying purposes.

As an illustration, three or more completely equipped airplane relay stations may be kept at an airport near New York city, and several more airplane relay stations may be kept at Cleveland; thus one airplane in the stratosphere immediately above New York city could serve an area extending from New York to Boston. Such a high-lift, slow-speed airplane might fly continuously at an altitude of six to seven miles over a small area for a length of time from four to eight hours, and when changing shifts another plane can go up into the stratosphere and take over the duty of the first airplane. If the weather turned bad in New York, the airplane could (with a fair fuel margin) fly to Cleveland and land at some airport there. Another airplane could, of course, during bad weather over the New York area, fly from Cleveland to New York to take over the duty of the airplane above New York city. It will thus be seen that a transmitter station located at the top of the Empire State Building in New York city could relay its signals to an airplane in the stratosphere immediately above New York city and, by means of only a single plane, service an area of a diameter of about 500 miles. The next airplane relay station could be located from the nearest adjacent airplane relay station by a distance from 400 to 600 miles and would also service an area of 500 miles, more or less, depending upon the altitude of the plane in the stratosphere. The first plane, let us say the one immediately over New York city, could obtain its signal from the terminal transmitting station on the top of the Empire State Building, and would relay the signal in the stratosphere to the next adjacent airplane relay station. If desired, the airplane relay station could employ a different frequency for serving the receivers immediately below than the frequency upon which it receives signals from the terminal station or from the adjacent relay station. Adjacent airplane relay stations could service the receivers below them either at the same frequency or at different frequencies.

One advantage of the present invention lies in the fact that it is feasible to service large areas with a minimum number of stations and at a minimum investment and cost of operation. Another advantage lies in the fact that a program can be sent directly from the studio up to the plane without the necessity of employing land wires.

Although the present invention contemplates the use of aircraft radio relaying stations, it is to be distinctly understood that the radio relaying stations are not limited solely to airplanes, although such planes are preferred over captive balloons or dirigibles. Dirigibles have the disadvantage of large wind surfaces and of not being as easily or readily controlled. Captive land balloons have the disadvantage of being tied down to ground by means of a connecting cable, thus introducing atmospheric and weather complications present in the lower atmospheres through which the cable extends, and also introducing the further complication produced by the great weight of the cable.

Figure 2:
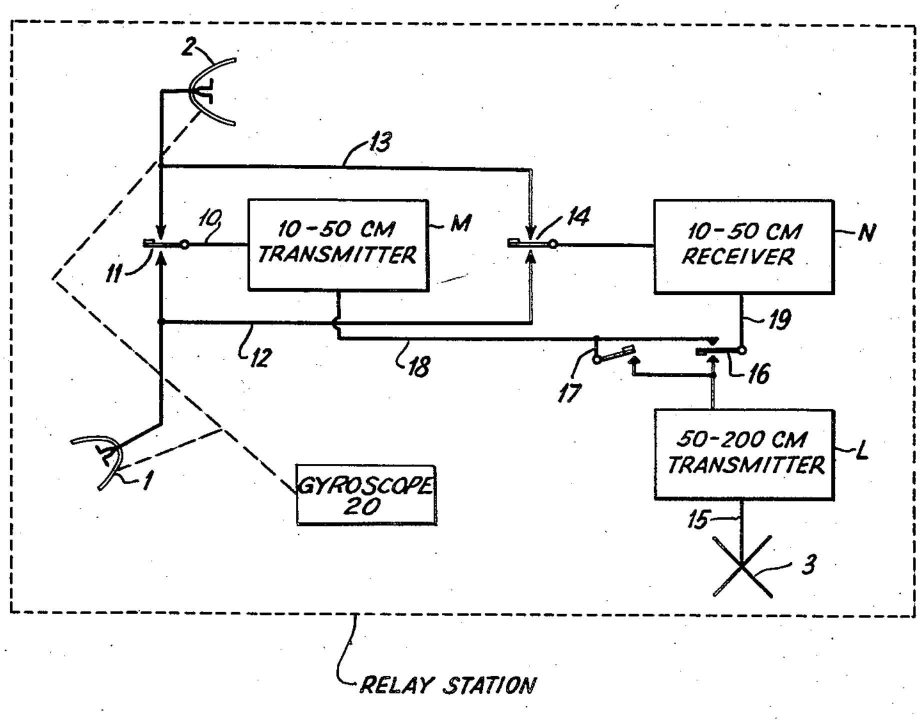

Other objects and advantages will appear from a reading of the following description, which is accompanied by a drawing wherein:

Fig. 1 shows diagrammatically a radio relaying system embodying the principles of the present invention; and Fig. 2 diagrammatically shows one form of relay station which can be employed in the airplane.

Referring in more detail to Fig. 1, there are shown a transmitting station A, a first airplane relay station B flying above station A in the stratosphere at an altitude of about seven miles, and a second airplane relay station C also flying in the stratosphere but removed from station B by a distance from 400 to 600 miles and receiving the relayed signals from airplane station B. Both relay or repeater stations B and C each have a service radius of about 200 to 300 miles. This limitation of the distance range is caused by the earth's surface interfering with greater distance communication along the earth. Since applicant employs line of sight communication at these ultra short waves, obviously the distance range is limited by the contour of the earth. It is contemplated that additional airplane relay stations may be employed for receiving signals from station C and/or from Station B. Airplane relay stations B and C are each provided with three antennas 1, 2 and 3. These antennas may be located in blisters on the airplane to reduce wind resistance. It is contemplated that antennas 1, 2 be directive to receive or transmit signals and be controlled by means of a gyroscope in the plane so that the direction of beam can be maintained in a particular line as the airplane continuously flies in a circle. Thus, directive antenna 1 of station B located on the bottom of the airplane will always be directive to receive signals from terminal ground station A, while directive antenna 2 of station B located on the top of the plane will be controlled to transmit signals to the next adjacent relay station C. Antenna 3 of station B is located at the bottom of the plane and is of the omnidirectional type for broadcasting to the ground area. This last antenna is fixed and may be a turnstile antenna of the type disclosed in United States Patent 2,086,976, granted to G. H. Brown July 13, 1937, wherein there are provided two sets of horizontal antenna elements arranged in 90° relation in the form of a symmetrical cross. Antennas 1 and 2 may be of the parabolic type having a dipole in the focus of the parabolic reflector. These last two antennas are pivotally arranged to swing under control of separate gyroscopes to maintain their direction or bearing on the desired station to which it transmits or from which it receives signals. The ground station A may be provided with any suitable antenna, although it is preferred (where broadcasting a television signal is concerned) to employ an antenna of the type disclosed in my United States Patent 2,239,724, granted April 29, 1941. Such preferred form of an antenna is now being used at the top of the Empire State Building in New York, New York. In airplane relaying station C, the antenna 2 on top of the plane is pivotally arranged and gyroscopically controlled to receive signals from the transmitting antenna 2 on station B. The broadcasting or omnidirectional antenna 3 on station C is used to broadcast the signals to the ground area below the plane. In station C, the antenna 1 is not here used, although, if desired, it may be employed for communication purposes between the plane and a ground station in a manner to be described later.

In Fig. 1, the terminal transmitting station A on the ground is designed to function on a particular frequency $f_1$, let us say, for example, in the range from ten to fifty centimeters. This signal is received by airplane station B and then sent out over antenna 2 toward airplane relay station C on the same frequency or at a different frequency $f_2$, if desired, in the range from, let us say, ten to fifty centimeters. It is preferred, though not essential, that the signal $f_1$ received by relay station B be converted to a new frequency $f_3$ before it is transmitted from antenna 3 to the ground area. This new frequency $f_3$ may, for example, be anywhere in the range from 50 to 200 centimeters. The conversion of the signal from $f_1$ to $f_3$ in relay station B may be accomplished by first amplifying the signal $f_1$ received on antenna 1, then converting it to the new frequency $f_3$ by beating with a local oscillator in the relay station. At station C, the signal from station B is received on antenna 2, which signal may be $f_1$ or $f_2$, and is radiated from antenna 3 on station C either on frequency $f_3$ or on a new frequency $f_4$, which frequencies are, in the example chosen, in the range from 50 to 200 centimeters. By using different frequencies, all possibilities of instability at the relay stations and/or distortion at the receiver stations can be eliminated. It should be distinctly understood that the range of frequencies herein mentioned are given by way of example only, and are not limited thereto inasmuch as any suitable wavelength may be employed from a few centimeters up to several meters in length.

Fig. 2 shows the apparatus which can be employed in one of the airplane relaying stations of the invention. In this relaying station, there are shown a transmitter M for radiating waves in the range from 10 to 50 centimeters whose output extends over lead 10 to the blade of the switch 11, the latter of which can be thrown to engage one of the two oppositely disposed contacts for operative association either with the directive antenna 1 or with the directive antenna 2. Also associated with antennas 1 and 2 through leads 12 and 13, respectively, and switch 14 is shown a receiver N for receiving signals in the range from 10 to 50 centimeters. Depending upon the position of the blade of switch 14, the receiver N may be operatively associated with either antennas 1 or 2. A transmitter L for radiating signals in the range from 50 to 200 centimeters is shown connected through its output lead 15 to the omnidirectional antenna 3. The input to the transmitter L can be connected by means of switch 16 to the output of receiver N, or if both switches 16 and 17 are closed, the input of transmitter M is also connected to be output of receiver N.

In the operation of the relay station of Fig. 2, the closure of switch 11 enables the relay station to transmit signals from the transmitter M over either one of the directive antennas 1 or 2, depending upon the position of the switch. As previously mentioned, antennas 1 and 2 are of the directive type and are preferably gyroscopically controlled by apparatus 20 to maintain their bearing or direction on the desired station with which it is desired to communicate. By throwing the switch 11 downward in order to connect the transmitter M to the antenna 1, the relay station can communicate with any desired ground station, such as a terminal station. By throwing the switch 11 in the upward direction to connect the transmitter M to the antenna 2, the relay station can communicate over antenna 2 with the next adjacent airplane relay station. If the switch 14 is thrown in the downward direction so as to connect the receiver N with lead 12 extending to directive antenna 1, the relay station can receive signals in apparatus N which are collected on the antenna 1. Similarly, if the switch 14 is thrown in the upward direction to connect the input of the receiver N to the lead 13 of the antenna 2, the relay station can then receive signals which are collected on antenna 2. By throwing the relay station switch 16 in a downward direction, it is possible for the relay station to transmit signals by means of apparatus L over omnidirectional antenna 3; that is, signals received by apparatus N can be passed on to transmitter L by means of switch 16 for the radiation of signals over antenna 3. If the relay station desires to reradiate the signals received by N over antennas 1 or 2 through the transmitter M, then the switch 16 can be thrown in an upward direction to connect the output of the receiver N to the input of the transmitter M via lead 18. The transmitter M can then, of course, reradiate the signals over either antenna 1 or 2, depending upon which antenna is used for transmission and which is used for the reception of signals. The relay station can also radiate signals simultaneously over antennas 3 and 2, or over antennas 3 and 1, by connecting the switches 16 and 17 in such manner that the output of the receiver N indicated by lead 19 is connected simultaneously to the transmitters M and L. This can be done by throwing switches 17 and 16 in the down position, so that the lead 19 representing the output of receiver N is connected at the same time to the transmitter L and to the transmitter M. From the foregoing, it will be evident that antennas 1 and 2 can be employed either for transmitting or receiving, and, if desired, transmission over either one of these antennas can be effected simultaneously or independently of transmission over antenna 3.

The switch arrangement and the range of frequencies mentioned in connection with Fig. 2 are given merely by way of example, since it will be apparent that other switching schemes and other ranges of frequencies can be employed within the principles of the present invention.

What is claimed is:

1. An aircraft relay station having a first directive antenna for receiving signals, a second directive antenna for transmitting signals, a gyroscopic control system for said directive antennas, and an omnidirectional antenna for transmitting signals, at least two of said antennas being operative simultaneously.

2. An ultra short wave relay station comprising an aircraft adapted for use above the earth's surface, a first directive antenna mounted on said aircraft for receiving signals, a second directive antenna on said aircraft for transmitting signals toward the next relay station, and switching means for reversing the functions of said directive antennas.

3. An ultra short wave relay station comprising an airplane having a motor for driving said airplane, a first directive antenna mounted on said plane for receiving signals, a second directive antenna for transmitting signals toward the next relay station, separate gyroscopic control means for said antennas, and switching means for reversing the functions of said directive antennas.

4. An ultra short wave relay station comprising an airplane, a first directive antenna for receiving signals, a second directive antenna for transmitting signals toward another station, and an omnidirectional antenna for broadcasting the received signals, said antennas being mounted on said plane, gyroscopic control means for at least one of said directive antennas, and switching means for employing any two or more of said antennas simultaneously.

5. A radio relaying station comprising an airplane, said station having mounted on said airplane a directive antenna for receiving signals and an omnidirectional antenna for broadcasting said signals over a wide area, and means for continuously maintaining the directivity or bearing of said directive antenna while the airplane changes position and is flying above the area to which signals are broadcast.

6. In a radio relaying system, an aircraft repeating station having a directive antenna, and a gyroscopic control system for maintaining the same effective position of said directive antenna with movement of said aircraft station.

7. In a radio relay system, an aircraft repeating station having a first directive antenna positioned for receiving signals from one remote station, a second directive antenna for transmitting the same signals to another remote station, and gyroscope control means for maintaining the same effective positions of said antennas with movement of said radio station.

8. In a radio system for broadcasting radio programs, a plurality of aircraft disposed for operation at heights above the surface of the earth which are substantially free of storms, each of said aircraft being above a separate point on the surface of the earth, a radio station disposed on the earth adjacent one of said points, said radio station comprising means for transmitting by radio to the aircraft located above the radio station a program, means on said last-named aircraft for relaying the program by radio to a second one of the aircraft, said last-named means comprising directional antennas on the respective aircraft for transmitting and receiving the relayed program, and means for maintaining said antennas directed towards each other despite changes in the attitude of the aircraft which otherwise would change the directions of the antennas, and means on at least one of said aircraft receiving the program for simultaneously broadcasting the program by radio to the surface of the earth adjacent the broadcasting aircraft.

9. In a radio system for broadcasting radio programs, a plurality of aircraft disposed for operation at heights above the surface of the earth which are substantially free of storms, each of said aircraft being above a separate point on the surface of the earth, a radio station disposed on the earth adjacent one of said points, said radio station comprising means for transmitting by radio to the aircraft located above the radio station a program, means on said last-named aircraft for relaying the program by radio to a second one of the aircraft, said last-named means comprising antennas on the respective aircraft for transmitting and receiving the relayed program at least one of which is a directional antenna, and means for maintaining said directional antenna directed toward the antenna on the other aircraft despite changes in the attitude of the aircraft which otherwise would change the directions of the antennas, and means on at least one of said aircraft receiving the program for simultaneously broadcasting the program by radio to the surface of the earth adjacent the broadcasting aircraft.

NILS E. LINDENBLAD.

REFERENCES CITED

The following references are of record in the file of this patent:

UNITED STATES PATENTS

| Number | Name | Date |
|---|---|---|
| 806,052 | Blackmore | Nov. 28, 1905 |
| 1,525,783 | Trenor | Feb. 10, 1925 |
| 1,624,966 | Morris | Apr. 19, 1927 |
| 1,939,345 | Gerth et al. | Dec. 12, 1933 |
| 1,981,884 | Taylor et al. | Nov. 27, 1934 |
| 2,028,857 | Zworykin | Jan. 28, 1936 |
| 2,155,821 | Goldsmith | Apr. 25, 1939 |
| 2,252,083 | Luck | Aug. 12, 1941 |
| 2,288,102 | Meredith | June 30, 1942 |